3 Sheets—Sheet 1.

T. B. HAND.
Mechanism for Stopping Runaway Horses.

No. 205,079. Patented June 18, 1878.

WITNESSES
E. J. Nottingham
A. W. Bright

INVENTOR
Thos. B. Hand,
By H. A. Seymour,
ATTORNEY

N. PETERS, PHOTO-LITHOGRAPHER, WASHINGTON, D. C.

T. B. HAND.
Mechanism for Stopping Runaway Horses.
No. 205,079. Patented June 18, 1878.
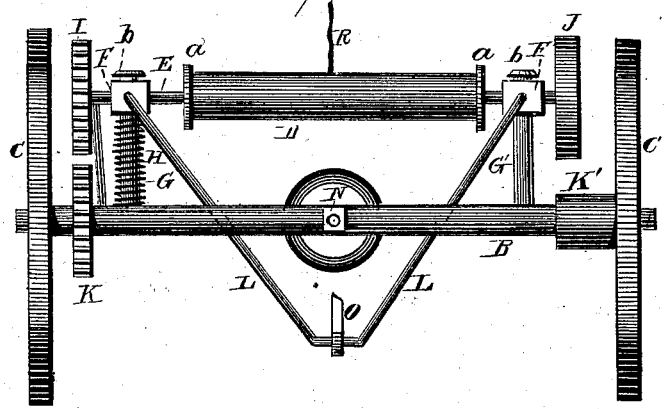
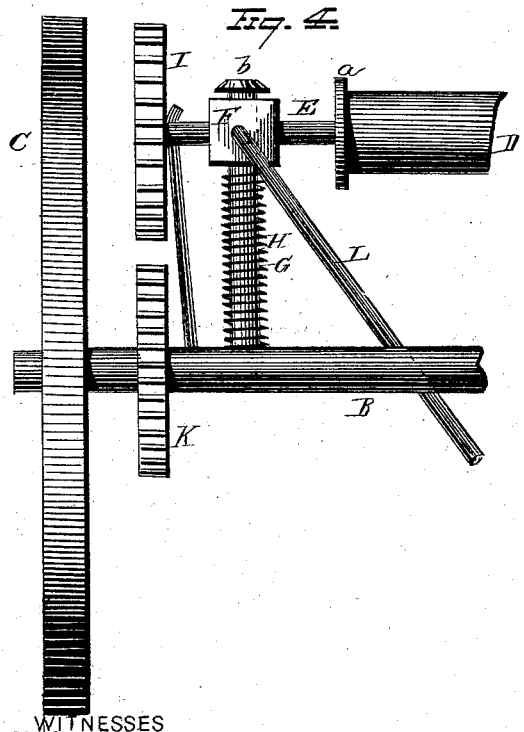
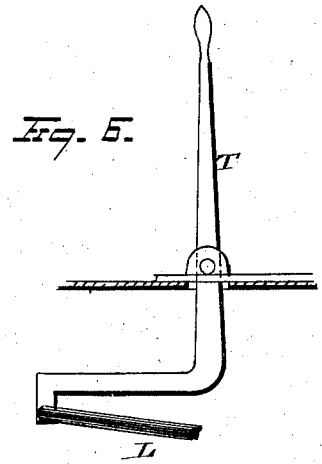

3 Sheets—Sheet 3.
T. B. HAND.
Mechanism for Stopping Runaway Horses.
No. 205,079. Patented June 18, 1878.
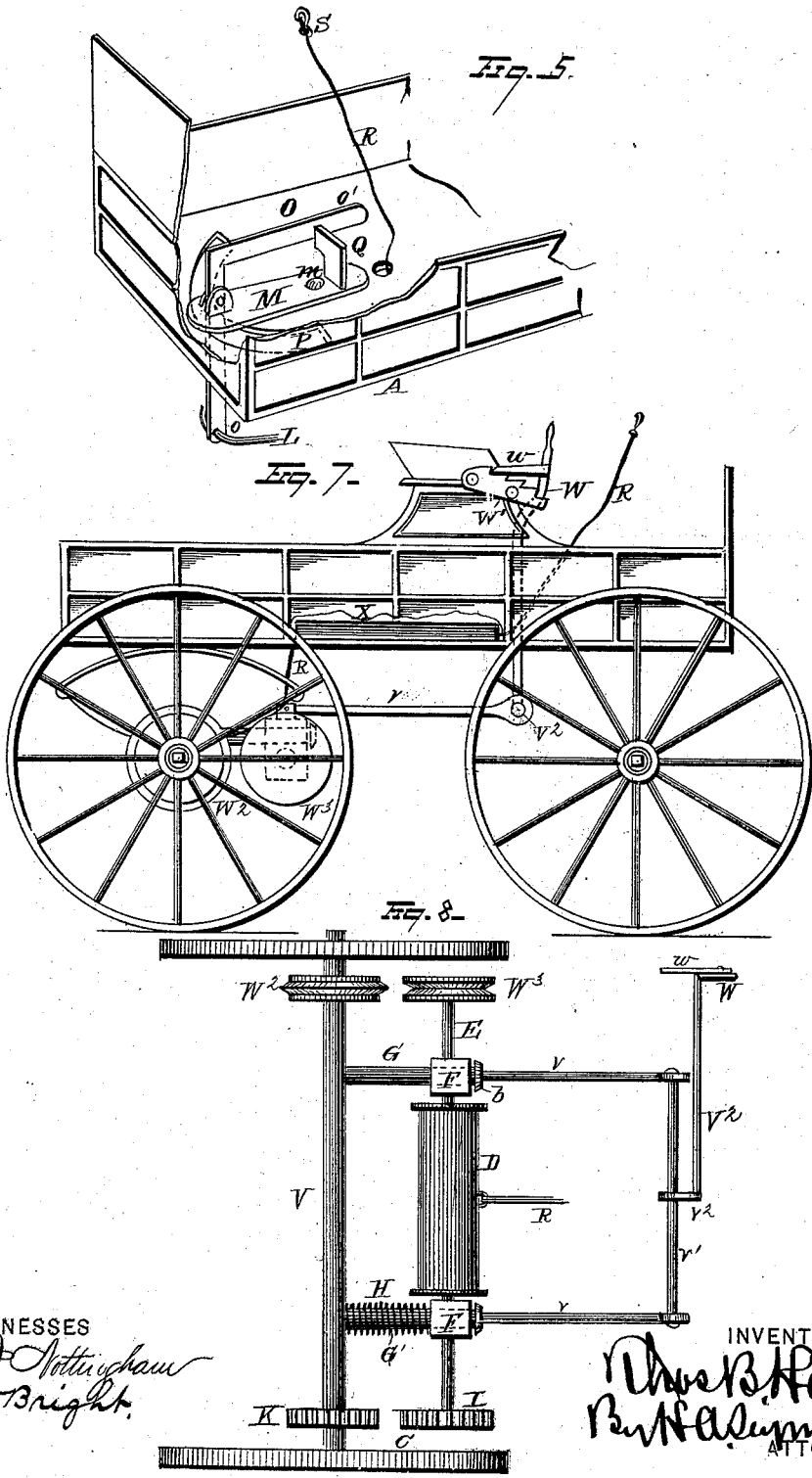
WITNESSES
INVENTOR
ATTORNEY

UNITED STATES PATENT OFFICE.

THOMAS B. HAND, OF BALTIMORE, MARYLAND.

IMPROVEMENT IN MECHANISMS FOR STOPPING RUNAWAY HORSES.

Specification forming part of Letters Patent No. 205,079, dated June 18, 1878; application filed June 3, 1878.

*To all whom it may concern:*

Be it known that I, THOMAS BARTON HAND, of Baltimore, in the county of Baltimore and State of Maryland, have invented certain new and useful Improvements in Mechanisms for Stopping Runaway Horses; and I do hereby declare the following to be a full, clear, and exact description of the invention, such as will enable others skilled in the art to which it pertains to make and use it, reference being had to the accompanying drawings, which form part of this specification.

My invention relates to improved mechanism for stopping runaway horses, the object being to provide wagons, carriages, or other vehicles with mechanism whereby a rope or strap one end of which is attached to the check or safety-rein of the harness may be wound upon a roller or drum by the revolution of the fore wheels of the vehicle, and effectually check the movement of the horse; and to this end my invention consists in the combination, with the forward axle of a vehicle, of a drum attached to a shaft supported in laterally-adjustable bearings, said shaft having cog or friction wheels attached thereto, which engage with cog or friction wheels attached to the fore wheels of the vehicle, and a bell-crank lever pivoted to a swinging plate, one end of said lever attached to arms connecting with the laterally-moving bearings of the drum or roller-shaft, while the opposite end of said bell-crank lever is located over the bottom of the vehicle, when it is within reach of the feet of the driver.

Figure 1:
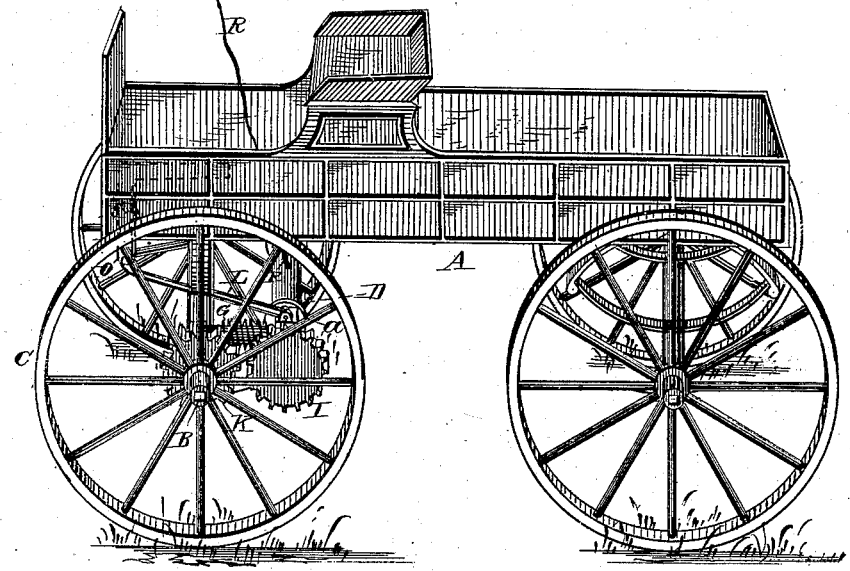
Figure 2:
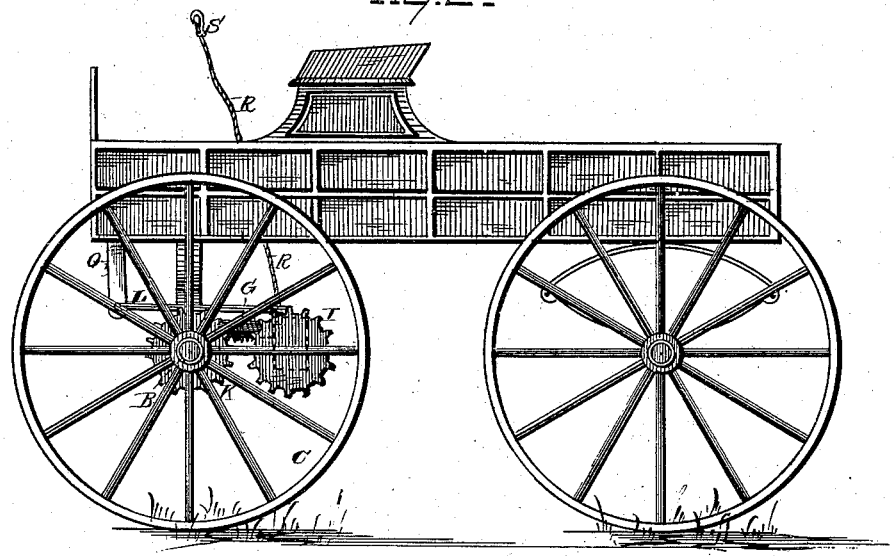

In the accompanying drawings, Figure 1 is a view, in perspective, of my invention. Fig. 2 is a side elevation of the same. Fig. 3 is a plan view of the forward axle provided with my improvement. Fig. 4 is an enlarged view of one end of the axle and roller-shaft provided with laterally adjustable bearings. Fig. 5 is a view, in perspective, of the bottom of the vehicle and the upper portion of the bell-crank lever pivoted to the swinging arm; and Figs. 6, 7, and 8 are modifications.

A represents the body of any vehicle. B is the front axle, having wheels C attached thereto. D is a drum or roller, provided with enlarged ends $a$, mounted on shaft E, the ends of which are journaled in laterally-adjustable bearing-blocks F.

To the forward axle B are rigidly secured the rearwardly-projecting guide rods or bars G G', upon which are placed the upper ends of the bearing-blocks F, the latter being provided with through-openings of sufficient size, whereby the blocks may be moved freely toward or from the axle B.

The extreme ends of guide-bars G G' are provided with stops $b$, to limit the movement of the bearing-blocks F.

Springs H are placed on the guide rods or bars G G', between the bearing-blocks and axles, to keep the bearings F forced against the stops $b$ when the mechanism is not needed for use.

Instead of employing spiral springs H for the purpose aforesaid, flat or elliptic springs may be disposed in any suitable manner to effect the same result.

On the ends of the shaft E are secured cog-wheels I and friction-wheel J; or both ends may be provided with cog-wheels or friction-wheels, as desired.

Cog-wheel I meshes with a cog-wheel, K, rigidly secured to the inner portion of the hub of one of the wheels C, and friction wheel or disk J engages with a sleeve, K', attached to the inner end of the hub on the opposite wheel.

Friction-wheel J is preferably constructed of a wooden or metallic wheel or disk, provided with a tire or covering of rubber or other suitable material; and the sleeve K' may be likewise furnished with a yielding covering, which may be readily replaced when worn.

Converging rods or braces L have their ends attached to the adjustable bearing-blocks F. To the floor of the vehicle is pivoted a swinging plate, M, by a stud, $m$, located in vertical line with the king-bolt N.

A bell-crank lever, O, is pivoted at its central portion to the forward end of the free end of the swinging plate.

The depending arm $o$ of bell-crank lever extends down through an arc-shaped slot or opening, P, in the bottom of the vehicle, and is attached to the forward ends of the converging rods or braces L, while the rear portion o' extends rearwardly, within easy reach of the feet of the driver, and, when depressed, is held by a catch-bar, Q.

A strap or rope, R, is secured at one end to the roller or drum E, while its free end is furnished with a snap-hook or equivalent device, S.

The operation of my improvement is as follows: When a horse is attached to the vehicle provided with the improvement as heretofore set forth, the free end of the rope or strap R is secured by its snap-hook to the check-rein of the harness; or it may be secured to my improved harness attachment for which Letters Patent were granted to me May 21, 1878. As the bell-crank lever is raised, and the cog or friction wheels on the supplemental shaft kept from engagement with cog or friction wheels on the fore wheels of the vehicle by means of the interposed spring or springs, the mechanism will not interfere with the free movement of the animal unless he should attempt to run away; and in that event the driver, by pressing down on the end of the bell-crank lever, causes the cog or friction wheels on the roller or drum shaft to be thrown in gear with corresponding cog-wheels or friction drums or sleeves on the forward wheels of the vehicle, thereby imparting a revolving motion to the drum and winding thereon the rope R, the effect of which will be to suddenly check the onward movement of the horse.

It will be observed that the attachment is free to move and turn with the forward axle, and hence the effectiveness of the mechanism is not lessened should the wheels be turned or cramped in either direction, as the revolution of the wheels either forward or backward will operate to wind the rope or strap on the drum and prevent the horse from running away.

An important feature of my invention consists in the fact that when a vehicle is furnished with my improved mechanism it is not necessary even to hitch a horse, and hence all trouble on that score is avoided.

When the occupant of the vehicle leaves it the bell-crank lever should be depressed and locked in place by means of the catch-bar, and in this position the mechanism is thrown in gear with the vehicle, and any movement of the wheels will operate to check the horse.

In Fig. 6 is represented a modification. T is a lever, pivoted to the bottom of the vehicle in any suitable manner. The lower end of lever T connects with the arms L, attached to the sliding bearings. By forcing the lever backward the attachment is thrown in gear with the vehicle-wheels in the same manner as hereinbefore described.

Fig. 7 represents a vehicle having my improved attachment combined with the rear instead of the fore axle. The rear axle V is provided with two horizontal guide-bars, G G', upon which are placed the laterally-adjustable bearing-blocks F. Springs H are placed on the guide-bars, between the axle and bearing-blocks, and operate to force the blocks F away from the axle. An auxiliary shaft, E, provided with a drum, D, is supported in bearing-blocks F. To the upper ends of bearing-blocks F are secured the arms $v$, the forward ends of which are connected by a cross-bar, $v^1$. $V^2$ is a rock-shaft, the arm $v^2$ of which is attached to cross-bar $v^1$. A handle, W, is attached to or formed as a part of rock-shaft, and extends upward within easy reach of the driver. To the side of the vehicle is secured a segmental rack, W', with which engages a pawl, $w$, pivoted to the upper part of handle W. The ends of shaft E are provided with cog-wheels I, which mesh with a cog-wheel, K, rigidly secured to the wheel, the same as heretofore described; or the grooved friction-wheels $W^2$ $W^3$ may be employed in lieu of the cog-wheels and effect the same result.

In order that the cord or strap may be conveyed to the drum under the rear portion of the body of the vehicle without obstruction, a tube, X, is attached to the bottom of the wagon for such purpose.

The operation of the modified form of attachment is substantially the same as heretofore described.

By forcing the handle W forward toward the dash-board, it operates to revolve the drum and wind the cord thereon. By releasing the pawl on the handle, the springs H serve to throw the drum-shaft out of gear with the running-gear of the vehicle.

Having fully described my invention, what I claim as new, and desire to secure by Letters Patent, is—

1. The combination, with the forward axle of a vehicle and a roller attached to a shaft the ends of which are supported in bearings laterally adjustable on guide bars or rods rigidly secured to the axle, of a bell-crank lever pivoted to a swinging plate located on the floor of the vehicle, the depending arm of said lever being attached to rods secured to said adjustable bearings, and cog or friction wheels attached to the roller-shaft and forward wheels of the vehicle, substantially as set forth.

2. The combination, with the forward axle of a vehicle having rearwardly-projecting guide-bars rigidly secured thereto, of a roller mounted on a shaft, the ends of which are journaled in bearings supported on said guide-bars, and springs interposed between the axle and bearings, substantially as set forth.

3. The combination, with the laterally-adjustable roller-shaft and the cog or friction gearing, substantially as hereinbefore described, of a bell-crank lever pivoted to a swinging plate and attached to rods connecting with said laterally-adjustable roller-shaft, substantially as set forth.

4. The combination, with the axle of a vehicle having horizontal guide-bars rigidly secured thereto, of a drum-shaft supported in bearing-blocks laterally adjustable on said guide-bars, springs interposed between the axle and bearing-blocks, cog or friction gearing attached to the drum-shaft and vehicle-wheels, and a suitable lever for throwing the parts in or out of gearing, substantially as set forth.

In testimony that I claim the foregoing I have hereunto set my hand this 16th day of May, 1878.

THOMAS BURTON HAND.

Witnesses:
BENJAMIN FRANKLIN FOXWELL,
A. A. WAGNER.